United States Patent Office 2,918,455
Patented Dec. 22, 1959

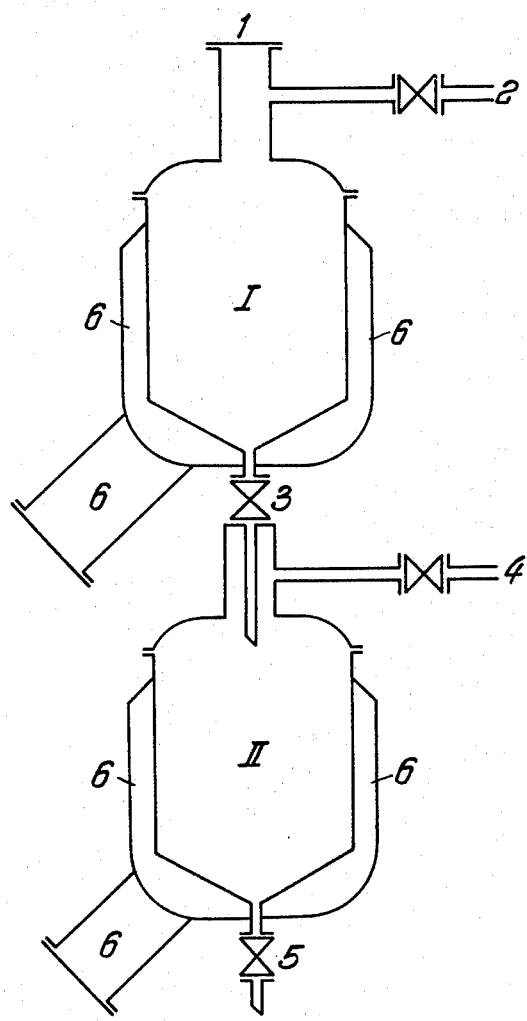

2,918,455
PREPARATION OF POLYAMIDES

Egon Elöd, Badenweiler, Richard-Eugen Dörr, Hamburg, and Heinrich Braun, Freiburg, Germany, and John Elian and Marcel Lepingle, Brussels, Belgium, assignors to RED-Gesellschaft m.b.H., Technik und Produkte: Cellulose, Chemie und Chemie der Kunststoffe, Hamburg, Germany, and Cellulose-Polymeres & Derives, "CE PE DE," Brussels, Belgium Application August 31, 1956, Serial No. 607,474

Claims priority, application Austria September 1, 1955

3 Claims. (Cl. 260—78)

The invention relates to improvements in the preparation of polyamides from dicarboxylic acids and diamines.

The general procedure consists in subjecting the starting materials, for instance adipic acid and hexamethylene diamine, to high pressures in an autoclave, so as to obtain polymerization and polycondensation. The preferred starting material in said process is the so-called AH salt (nylon salt), which consists of equimolecular amounts of adipic acid and hexamethylene diamine.

It is common knowledge that it is difficult or almost impossible to carry out polymerizations or polycondensations of solid reactants, such as the AH salt recited above, in such a way as to obtain uniform polymerization products; therefore, water has been employed as a solvent in the commercial manufacture of superpolyamides. However, when the process is carried out in an aqueous medium, high temperatures and correspondingly high pressures have to be applied in order to obtain the desired precondensation products. After the precondensation product has been formed, the water is removed, and the polymeriation is terminated at higher temperatures.

In the conventional procedure, the AH salt has been usually dissolved in water to an about 60% solution, and a small amount, for instance about 0.2 to 0.5% of acetic or adipic acid has been added to effect the so-called chain interruption, for controlling the length of the polymer chain. The aqueous solution of the AH salt is, in the absence of oxygen, first heated in an autoclave to about 220 to 230° C., whereby according to the temperature, the pressure rises to about 15 to 16 atm over atmospheric pressure. Then, the pressure is slowly released, and the temperature in the autoclave is increased to about 275 to 280° C. In the first step, which is being carried out under pressure, a precondensation product of relatively low molecular weight is obtained, which at said high temperature remains dissolved in water. After the pressure and water vapor have been released, the final polymeriation is accomplished by heating at polymerization temperature in such a way that the reaction mixture is subjected for some time to reduced pressure; the mixture is treated in this way until the anhydrous material has obtained the desired condensation degree.

Polyamides have also been prepared from starting materials, the salts of which melt more readily (at lower temperatures) than the AH salt from adipic acid and hexamethylene diamine. In this method, the starting salts are molten in the dry state at atmospheric pressure; after distilling off the water of reaction, the melt is heated under reduced pressure until the desired polymerization degree is reached. This procedure has the serious drawback that the obtained polyamides have no uniform degree of polymerization but represent mixtures of polyamides of widely varying molecular sizes. The reason therefor is that on melting together a dicarboxylic acid and a diamine, or their salt, under dry conditions, at once a rather viscous mass of low heat conductivity is formed which results in a very irregular heat transfer from the heated walls of the reaction vessel into the mass. On manufacture on a commercial scale, said difficulty cannot be overcome by simple means like stirring. After the water of reaction has been distilled off, the mass is getting more viscous in the course of the polymerization reaction carried out at elevated temperatures. Therefore, it is not possible to subject the entire mass to uniform heating from the walls of the reaction vessel. The mass adjoining the walls of the vessel will be brought to a higher polymerization degree than the mass in the core zone, and a mixture of polymers of very different polymerization degrees is obtained.

The principal object of the present invention is to provide a simple and economic method for the preparation of polyamides having a uniform high polymerization degree.

Other objects and advantages will be apparent from a consideration of the specification and claims.

According to the invention, a relatively small amount of an organic compound is added to the polyamide forming reactants or salts thereof, for instance to the AH salt defined above, or to mixtures thereof with other polyamide forming compounds, so as to form with said reactants at relatively low temperatures of about 150 to 165° C. a homogeneous melt, which, on further heating at temperatures of about 250 to 275° C. and atmospheric pressure, directly yields the desired polymerized end product. At, or somewhat below said polymerization temperature of 250 to 275° C., the melting point depressant must be volatile, so as to be distilled off or removed with the water of reaction, and it must not react with the polyamide forming materials. We have found m-cresol in amounts of not more than 50 percent, preferably in an amount of about 30 percent by weight of the reaction mixture, particularly suitable. However, other mono- or polyvalent organic compounds containing more than two C atoms and at least one hydroxyl group, satisfying the above recited conditions, may also be used, alone or in mixture with each other or with m-cresol. Preferably, such compounds are liquid at room temperature, but semi-solid or solid compounds may also be employed; examples of such compounds are phenols, p-cresol, o-cresol, glycols, polyglycols, and others.

By using additions of the type set forth hereinabove, the polymerization or polycondensation of the reactants is started at temperatures below their normal melting points, as said reactants are converted to a homogeneous melt at a temperature as low as about 150 to 165° C.; the polymerization is terminated by gradually raising the temperature of the melt to about 250 to 275° C., whereby the melting point depressant is driven off. The removal of the latter may be facilitated by applying reduced pressure towards the end of the polymerization; the remaining pure melt is then maintained under reduced or atmospheric pressure at polymerization temperature until the desired polymerization degree is obtained. If desired, the product forced out of the autoclave, for instance by means of oxygen-free nitrogen, may subsequently be subjected to an additional polymerization procedure.

When m-cresol is used as melting point depressant, a homogeneous melt is obtained at a temperature of about 150° C. and at atmospheric pressure in about 20 to 30 minutes. After increasing the temperature to about 275° C., the water of reaction and m-cresol is removed generally in less than 1 hour, for instance within about 40 minutes.

According to the invention, the starting materials for the formation of a polyamide, after being admixed with the formation of a polyamide, after being admixed with a suitable amount of said melting point depressant, are converted to a homogeneous melt by heating at moderate temperatures, whereby already pre-polymerization takes place; for mixtures of AH salt and m-cresol, for instance, heating at about 150 to 170° C. produces a homogeneous melt. Subsequently, said eutectic melt is further heated with gradual rise of the temperature to about 275° C. at atmospheric pressure in the absence of oxygen, whereby polymerization or polycondensation takes place.

In the course of the recited heating procedure first water of reaction is distilled off, whereby the developed steam bubbles rise in homogeneous distribution through the fluid melt and cause thorough mixing of the mass and a very even distribution of the heat transferred from the walls of the reaction vessel throughout said mass. On further rise of the temperature, also the melting point depressant is distilled off, which takes place with abundant formation of bubbles and vigorous agitation of the melt; in this way, a homogeneous distribution of the heat through the entire mass is ensured, which is in continuous bubbling motion. After the polymerization temperature proper has been reached and the polymerization has proceeded to the desired extent, said polymerization temperature is maintained in a final stage carried out at reduced pressure, whereby the residual organic melting point depressant is distilled off with formation of bubbles and thorough mixing of the mass. Because of the continuous agitation of the melt by the developed vapor bubbles, the polymerization proceeds evenly under conditions, at which all parts of the melt are converted to a polyamide of substantially uniform polymerization degree, which polyamide is pure, ready for use, and free of the melting point depressant. The polyamide may be withdrawn from the reaction vessel by simple means, for instance it may be forced out by oxygen-free nitrogen, and put to the desired use.

As set forth hereinabove, the organic compounds added as melting point depressants must satisfy the following conditions: They must convert the polyamide forming starting materials to a homogeneous eutectic melt at rather low temperatures, for instance at about 150 to 165° C.; during the polymerization, they must evaporate with formation of bubbles and thereby ensure a homogenization of the melt and a uniform heat distribution through the whole mass; finally, they must be capable of complete removal by evacuation in the final phase of the polymerization.

The amount of the melting point depressant is, of course, to be adjusted so as to meet the above recited conditions without affecting the polymerization process. Generally, said amount should not exceed about 30 percent by weight of the polyamide forming reactants. Only in exceptional cases, the addition may be increase to 50 percent. On the other hand, said amount must be large enough to ensure the desired decrease of the melting point and the thorough mixing of the mass during the heating operations by formation of bubbles. The lower limit is generally at about 20 percent. The most suitable amounts are readily ascertained in each case by a simple preliminary test.

The following examples are given to illustrate the method of the invention, it being understood that the invention is not to be limited to the details given therein.

*Example 1*

5 kg. of AH salt are mixed with 1.5 liters of m-cresol, and the mixture is heated at atmospheric pressure to about 165° C. under exclusion of oxygen. The temperature of the obtained melt is slowly, within an hour, raised to about 275° C., whereby a mixture of water and m-cresol is distilled off. Subsequently, the last residues of m-cresol are removed under reduced pressure, while the polymerization temperature of about 275° C. is maintained, and heating at said temperature is continued until the desired polymerization degree, which may for instance correspond to a molecular weight of 25,000, is obtained. The yield of polyamide is about 97 percent.

In the same manner, conjoint polymers may be prepared, as may be shown in an example for the copolymerization of hexamethylene diamine adipate and hexamethylene diamine terephthalate.

*Example 2*

1.5 kg. of hexamethylene diamine adipate are mixed with 500 g. of hexamethylene diamine terephthalate and 600 g. of m-cresol. By heating the mixture at 165° C., a homogeneous melt is obtained. Subsequently, the temperature of the melt is slowly raised to about 275° C., and the water of reaction and m-cresol are substantially distilled off after 20 minutes, while the melt becomes viscous. In order to terminate the reaction and to remove the last traces of m-cresol, heating at 275° C. is continued under reduced pressure until the desired polymerization degree is obtained.

The method can be carried out in an apparatus consisting of two superposed heatable vessels. Such an apparatus is, by way of example, illustrated in the accompanying drawing.

As will be noted on viewing the drawing, an upper vessel I is provided with an upper feed opening 1, and an outlet 2 for escape of the vapor bubbles generated on heating. The lower part of the vessel I contains a discharge opening 3, through which the melt can be discharged into the vessel II arranged below vessel I, after the reaction in vessel I is terminated. The vessel II is, like the vessel I provided with an outlet 4 for removing the vapor bubbles given off by the melt. An opening 5 in the lower part of vessel II allows the discharge of the finished polyamide melt. The charge and discharge openings of both vessels can be opened and closed by means of suitable valve means. Both vessels are provided with heating jackets 6. Toward the end of the polymerization reaction, vessel II is placed under vacuum by applying suction to the vapor exhaust opening 4.

In the described apparatus, the method of the invention may be carried out as follows: First, a thin-flowing melt is prepared by mixing the starting material, for instance AH salt, with the melting point depressant, for instance m-cresol, and heating the mixture at a temperature of 150–165° C. Said melt may be prepared in vessel I, or it may be prepared in a separate vessel and then charged through the inlet 1 into the vessel I. In vessel I, the melt is maintained for a relatively short time, for instance for a period of about 20 minutes, at a temperature suitable to initiate the polymerization, for instance 150 to 165° C., whereby the water of reaction and small amounts of the melting point depressant are distilled off with formation of bubbles and thorough mixing of the melt. The generated vapors are removed through the outlet 2. Subsequently, the lower outlet 3 of the vessel I is opened and the melt is discharged into the lower vessel II, wherein it is further heated to raise its temperature to the polymerization temperature (for instance, about 275° C.) Thereby, the bulk of the melting point depressant, and any water of reaction still present, are distilled off with good mixing of the melt by the vapor bubbles, and the vapor is removed through outlet 4. This operation requires about 20 to 40 minutes. Finally, vessel II is placed under vacuum by applying suction to the vapor outlet 4, while the polymerization temperature of about 275° C. is maintained; in this way m-cresol still present in the melt is completely drawn off. After the melt has been freed from the melting point depressant and the desired polymerization degree has been obtained, the formed polyamide is withdrawn in form of a melt through the lower outlet 5 of the melting vessel II.

Generally, the entire procedure is terminated after about 120 minutes.

An apparatus as set forth hereinabove offers the advantage of premitting a semi-continuous operation. While polymerization is carried out in vessel II, simultaneously a fresh melt may be prepared from the starting materials in vessel I; after the finished polyamide melt has been withdrawn from vessel II, the new batch can immediately be conveyed from vessel I to vessel II and subjected therein to polymerization.

In the manufacture of polyamides, it has already been proposed to carry out the polymerization or polycondensation in the presence of organic diluents. Such diluents were intended to act essentially as solvents, and they were, therefore added in relatively large amounts, for instance in the proportion of 1 part by weight of diluent to 1 part by weight of the polyamide forming mixture. The batch was then heated at polymerization temperature over a long period of time to effect the polymerization; after the desired polymerization degree had been obtained, the entire mass was introduced with stirring into a large volume of ethyl alcohol to precipitate the formed polyamide. This procedure has the drawbacks that the presence of a large amount of an organic diluent during the whole polymerization procedure requires an excessive time for completing the polymerization, and that the processing of the reaction product by stirring it into alcohol and precipitating the polymer is inconvenient and complicated. It is very difficult to free the polyamides in this manner from the organic diluents. If, for instance, m-cresol is used as a diluent, the removal thereof by precipitation of the polyamides would require a great number of manipulations. The precipitated polyamides have usually greasy consistency and are therefore difficult to handle. If they are obtained in gritty or flaky form, they always include still organic diluents. A further drawback of the precipitated material is that it is difficult to melt.

According to this invention, much smaller amounts, for instance about 30 percent of a suitable organic additive are used, which lower the melting point and allow of producing a melt at relatively low temperatures, and which are completely distilled off in the course of the polymerization. The vigorous generation of vapor bubbles keeps the melt incontinuous agitation and ensures a uniform heat transfer which results in the production of polyamides of substantially uniform polymerization degree.

We claim:

1. A process for the preparation of linear polyamides comprising heating a composition containing substantially a salt of adipic acid and hexamethylene diamine in equal molecular amounts and about 20 to 30 percent calculated on the weight of said composition, of an organic melting point depressant which is volatile at temperatures of about 185 to 250° C. and selected from the group consisting of phenols and glycols at atmospheric pressure at about 150 to 165° C. to produce a homogeneous melt with distillation of a small portion of said melting point depressant, then gradually raising at atmospheric pressure the temperature to about 250 to 275° C. with simultaneous distillation of the formed water of reaction and of the major portion of said melting point depressant and with ensuing continuous increase of the concentration of the melt, said concentrated viscous melt being thoroughly mixed and its temperature being equalized by the vapor bubbles of the melting point depressant which are continuously formed inside the melt and stir the melt while evaporating, and finally distilling off the remainder of the melting point depressant under reduced pressure while maintaining said temperature at about 250 to 275° C.

2. The process as claimed in claim 1 wherein m-cresol is used as said melting point depressant.

3. The method of claim 1, wherein heating times for the entire process do not exceed about 120 minutes.

References Cited in the file of this patent

UNITED STATES PATENTS

| 2,158,064 | Carothers | May 16, 1939 |
| 2,190,770 | Carothers | Feb. 20, 1940 |
| 2,274,831 | Hill | Nov. 3, 1942 |
| 2,389,628 | Martin | Nov. 27, 1945 |